United States Patent [19]

Asai

[11] Patent Number: 5,720,989
[45] Date of Patent: Feb. 24, 1998

[54] MOLD FOR MOLDING OPTICAL DISK, HAVING STAMPER HOLDING MEMBER INCLUDING MUTUALLY ENGAGING INNER AND OUTER RINGS

[75] Inventor: Ikuo Asai, Nagoya, Japan

[73] Assignee: Kabushiki Kaisha Meiki Seisakusho, Japan

[21] Appl. No.: 787,376

[22] Filed: Jan. 22, 1997

[30] Foreign Application Priority Data

Jan. 23, 1996 [JP] Japan ..................... 8-008966

[51] Int. Cl.⁶ ........................................... B29C 45/26
[52] U.S. Cl. ............... 425/192 R; 425/437; 425/553; 425/554; 425/810; 425/DIG. 60
[58] Field of Search .................. 425/190, 192 R, 425/437, 553, 554, 810, DIG. 60

[56] References Cited

U.S. PATENT DOCUMENTS

| | | | |
|---|---|---|---|
| 4,737,096 | 4/1988 | Poorten | 425/190 |
| 5,330,693 | 7/1994 | Takada | 425/810 |
| 5,593,710 | 1/1997 | Asai | 425/810 |

FOREIGN PATENT DOCUMENTS 5-13537 4/1993 Japan.
5-185475 7/1993 Japan.

*Primary Examiner*—James P. Mackey
*Attorney, Agent, or Firm*—Parkhurst, Wendel & Burr, L.L.P

[57] ABSTRACT

A mold for molding an optical disk including a pair of mold halves which cooperate to form a mold cavity for forming the optical disk, an annular plate-like stamper and a stamper holding member. One of the pair of mold halves has an annular recess in a radially inner portion thereof. The stamper has a center hole and is positioned in the mold cavity. The stamper holding member is removably accommodated in the annular recess for supporting the stamper at an inner peripheral portion. The stamper holding member includes a first ring member having an annular collar portion extending radially outwardly from an axial end of the first ring member, and a second ring member removably fitted on an axial end portion of the first ring member. The stamper is positioned such that the inner peripheral portion is interposed between the annular collar portion of the first ring member and an inner portion of the second ring member. The mold halve has a first and a second air passage which are open to respective portions of the annular recess, for applying vacuum air to the stamper holding member and feeding compressed air to the mold surface.

10 Claims, 5 Drawing Sheets

5,720,989

MOLD FOR MOLDING OPTICAL DISK, HAVING STAMPER HOLDING MEMBER INCLUDING MUTUALLY ENGAGING INNER AND OUTER RINGS

BACKGROUND OF THE INVENTION

1. Field of the Invention

The present invention relates in general to a mold for molding an optical disk of a synthetic resin material, such that desired information stored on an information-bearing surface of a stamper is copied or reproduced on the molded disk. More particularly, this invention is concerned with such a mold having a novel construction for holding a stamper thereto.

2. Discussion of the Related Art

There have recently been used optical disks in various fields of the art such as audio, video and computer systems. The optical disks are generally produced by a mold consisting of a pair of mold halves, i.e., a stationary mold half and a movable mold half, both of which have respective mold surfaces cooperating to define therebetween a mold cavity. An annular stamper on which desired information are stored, is fixed to at least one of the mold halves. The stationary and movable mold halves are brought to a closed position to define the mold cavity, and a synthetic resin material is injected into the mold cavity. As a result, the optical disk is molded such that the information stored on the stamper is reproduced or copied on the substrate of the molded disk. Further, a reflector film is formed on the surface of the substrate by sputtering, as desired. Thus the desired optical disk is produced.

As disclosed in laid-open Publication No. 5-13537 of examined Japanese Utility Model application, a conventional mold for molding an optical disk has a substantially cylindrical stamper holding member which is inserted into and screwed to a center portion of one of the mold halves. The stamper holding member includes an annular collar portion at one of its axial end portions for holding an annular stamper on the molding surface such that the annular stamper is held at an inner peripheral portion thereof by the annular collar portion.

The stamper holding member has to be removed from and installed on the mold half each time the stamper is changed. The conventional type of the stamper holding member is screwed to the mold half, so that it is cumbersome and time-consuming to change the stamper, leading to deterioration in the efficiency of molding of the optical disk.

As described in the above-mentioned publication, a stationary sleeve, such as a female cutter sleeve, is inserted through a center bore of the stamper holding member, in general. An information bearing surface of the stamper and the corresponding front end faces of the stamper holding member and the stationary sleeve cooperate with each other to define a mold surface of a mold cavity. Through a clearance between the stamper holding member and the stationary sleeve, a stream of compressed air is directed to a radially inner portion of a molded product (an optical disk) formed in the mold cavity in the presence of the stamper, so that the product is removed from the mold cavity by the compressed air.

In recent years, there has been an increasing demand for an optical disk having a flat surface over the substantially entire area, so called "a super-picture bearing disk", which has a printed design in a large, radially inner area of the disk, for the purpose of improving the product value of the optical disk. To this end, the diameter of the stamper holding member is reduced, to reduce the non-printable area which is formed in a radially inner portion of the surface of the molded disk by the collar portion of the stamper holding member. This reduction of the diameter of the stamper holding member makes it difficult to provide a sufficient space for the stationary sleeve, which is disposed radially inwardly of the stamper holding member. Further, the reduced diameter of the stamper holding member makes it difficult to provide a sufficient space for a passage for the compressed air for removing the molded product from the mold cavity. Generally, a stamper having a center hole with a diameter of 22 mm is employed for molding the super-picture bearing disk which has a center hole with a diameter of 15 mm. When the stamper holding member has an outside diameter of about 22 mm, the inside diameter of the stamper holding member should be 15 mm so as to provide a required cylindrical wall thickness in view of the strength and ease of manufacture of the stamper holding member, which is a comparatively long sleeve. In this case, however, it is extremely difficult to obtain a sufficient space for the compressed air passage in the radially inner portion of the stamper holding member.

There is disclosed another type of mold in laid-open Publication No. 5-185475 of unexamined Japanese Patent Application, which is constructed such that a positioning protrusion is formed in the central portion of the mold surface of the mold cavity, for engagement with the center hole of the stamper to thereby positioning the stamper. In this mold, suction passages are opened in the mold surface of the mold cavity for applying vacuum to the stamper to thereby hold the stamper under suction. The mold of this type is not effective for molding a desired optical disk. Namely, the collar portion is not provided for holding the inner circumferential portion of the stamper, so that the synthetic resin material undesirably flows into the clearance between the center hole of the stamper and the positioning protrusion, resulting in burrs formed at the inner periphery of the molded product.

SUMMARY OF THE INVENTION

It is therefore a first object of the present invention to provide a mold for molding an optical disk having an improved construction, which provides a sufficient space for a compressed airpassage opened in the mold surface of the mold cavity and which permits easy installation and removal of an annular stamper, even where the stamper has a relatively small center hole.

A second object of this invention is to provide a mold for molding an optical disk having an improved construction, which prevents a flow of a synthetic resin material into a clearance between the inner periphery of the annular stamper and a stamper holding member, thereby preventing formation of burrs at the inner periphery of the molded product.

These objects indicated above may be achieved according to the present invention which provides a mold for molding an optical disk, the mold comprising: (i) a pair of mold halves which cooperate to form a mold cavity for forming the optical disk, one Of the mold halves having an annular recess which is open to a radially inner portion of the mold cavity; (ii) an annular plate-like stamper having a center hole and positioned in the mold cavity, the stamper having information to be copied on the optical disk; and (iii) a stamper holding member removably accommodated in the annular recess, for supporting the stamper at a radially inner peripheral portion thereof which defines the center hole, the stamper holding member including (a) a first ring member extending through the center hole of the stamper such that the stamper is fitted on the first ring member, the first ring member having an annular collar portion which extends radially outwardly from one of axially opposite ends of the first ring member, and (b) a second ring member removably fitted on an axial end portion of the first ring member which is remote from the one of the axially opposite ends, the stamper being positioned such that the radially inner peripheral portion is interposed between the annular collar portion of the first ring member and a radially inner portion of the second ring member. The above-indicated one of the mold halves has a first air passage and a second air passage which are open to respective portions of the annular recess, so that vacuum is applied through the first air passage to the stamper holding member to hold under suction the stamper holding member to the one of the mold halves, and so that compressed air is introduced into the mold cavity through a clearance between an inner circumferential surface of the first ring member and an outer circumferential surface of the one of the mold halves which defines an inside diameter of the annular recess.

In the mold for molding the optical disk constructed according to the present invention, the annular stamper is held by the stamper holding member such that the annular stamper is fitted on the outer circumferential surface of the first ring member and is interposed between the collar portion of the first ring member and the second ring member, so that an axial movement of the stamper is prevented. The stamper holding member is removably accommodated in the annular recess such that one of the axially opposite end faces of the second ring member which is not in contact with the surface of the annular recess, is flush with the corresponding axial end face of the mold half, so that the stamper is disposed in contact with these end faces of the mold and the second ring member while the radially inner peripheral portion of the stamper is interposed between the annular collar portion of the first ring member and the radially inner portion of the second ring member.

In the mold of the present invention, the stamper holding member is disposed on the mold half, such that the stamper holding member is accurately positioned relative to the mold half while the stamper holding member is fitted in the annular recess formed in the mold half. The stamper holding member is attracted to the mold half under suction of the vacuum air. Thus, the stamper holding member is easily fixed to and removed from the mold half, with improved efficiency, in comparison with a stamper holding member used with the conventional mold which is screwed to the mold.

Further, the stamper holding member of the present invention is attracted to the mold half under suction of the vacuum air, so that a mechanical strength required for the stamper holding member is smaller than that of the conventional stamper holding member. Further, the stamper holding member of the present mold does not require a conventionally provided threaded portion, and has an accordingly reduced size. In addition, the second ring member is adapted to contact with a portion of the stamper which is radially outward of the first ring member. The second ring member may have a sufficient radial wall thickness and gives a sufficient mechanical strength to the stamper holding member. Further, the second ring member may have a sufficiently large axial end face to which the vacuum is applied to fix the stamper holding member to the mold half.

In the stamper holding member constructed according to the present invention, the required radial wall thickness of the first ring member can be reduced and the inside diameter of the first ring member can be accordingly increased, while assuring a sufficient mechanical strength of the stamper holding member, and a sufficient strength of attachment of the stamper holding member to the mold half. As a result, the stamper holding member provides a sufficient space for an air passage radially inwardly of the first ring member, for feeding a stream of compressed air to the mold surface, to remove molded optical disk from the mold half with high efficiency, even if the diameter of the center hole of the stamper is reduced.

The first ring member of the stamper holding member is provided at its one axial end portion with the radially outwardly extending the collar portion, such that the collar portion covers the radially inner peripheral portion of the stamper. The collar portion is capable of preventing a flow of the synthetic resin material into the clearance between the center hole of the stamper and the stamper holding member, making it possible to prevent undesirable formation of burrs at the inner periphery of the molded optical disk.

Inside the mold constructed according to the present invention, there are formed the first and second air passages for applying vacuum air to the stamper holding member and feeding compressed air to the mold surface, respectively. The first and second air passages are open in the respective portions in the annular recess. In one preferred form of the invention, the above-indicated first air passage is open in a bottom surface of the annular recess, which bottom surface contacts the second ring member, and the above-indicated one of the mold halves includes a sealing member for providing air tightness between open ends of the first and second air passages which are open to the respective portions of the annular recess.

In the mold constructed according to the above-preferred form of the invention, the vacuum air is effectively applied to the second ring member, whereby the required radial wall thickness of the first ring member can be effectively reduced, while assuring sufficient strength of attachment of the stamper holding member to the mold half. The reduced wall thickness of the first ring member permits the annular stamper to have a center hole having an accordingly reduced diameter. Further, the compressed air is fed to the mold surface through the second air passage and through a clearance between the first ring member and the opposed surface of the annular recess. Moreover, the air passages for the vacuum air and the compressed air are airtightly separated from each other by the sealing member, permitting stable attraction of the stamper holding member to the mold half, and easy removal of the molded product from the mold half.

In a second preferred form of the present invention, the above-indicated one of the mold halves has a portion which cooperates with the stamper holding member to define a first annular air chamber and a second annular air chamber which communicate with the first and second air passages, respectively. According to this form of the invention, the stream of vacuum air provided through the first air passage can be effectively supplied to a wide surface area of the second ring member of the stamper holding member via the first annular air chamber, thereby permitting the stamper holding member to be stably fixed to the mold half. On the other hand, the stream of compressed air provided through the second air passage can be uniformly supplied to the mold surface through the circumferential clearance between the first ring member and the opposed surface of the annular recess, whereby the molded optical disk is effectively removed by the compressed air. Preferably, the first air chamber is formed between the bottom surface of the annular recess and the second ring member, and the second air chamber is formed between a radially outer circumferential surface of the annular recess and the first ring member.

In a third preferred form of the present invention, the stamper holding member includes positioning means for axially positioning the second ring member relative to the first ring member. Namely, the positioning means functions to determine the axial position of the second ring member with respect to the first ring member, when the second ring member is disposed radially outwardly on the first ring member. The positioning means permits easy and stably assembling and disassembling of the first and second ring members, with improved efficiency and accuracy. The first and second ring members may be fastened to each other, with suitable fastening means as well known in the art, such as a mechanism using screws or lock pins, and attracting means using a magnet or vacuum air.

According to the present invention, one or both of the stationary and movable mold halves may be provided with the stamper holding member for holding the annular stamper on the corresponding mold half. That is, the annular stamper held by the stamper holding member may be provided for at least one of the stationary and movable mold halves. When the stamper is provided for the stationary mold half, the stationary mold half may include a female cutter sleeve having an end portion whose outer circumferential surface defines the inside diameter of the annular recess, and the female cutter sleeve has a cutting edge at the end portion thereof for cutting off a central portion of the optical disk formed in the mold cavity in the presence of the annular plate-like stamper.

BRIEF DESCRIPTION OF THE DRAWINGS

The above and other objects, features, advantages and technical and industrial significance of the present invention will be better understood by reading the following detailed description of a presently preferred embodiment of the invention, when considered in connection with the accompanying drawings, in which.

DETAILED DESCRIPTION OF THE PRESENT EMBODIMENTS

Figure 1:
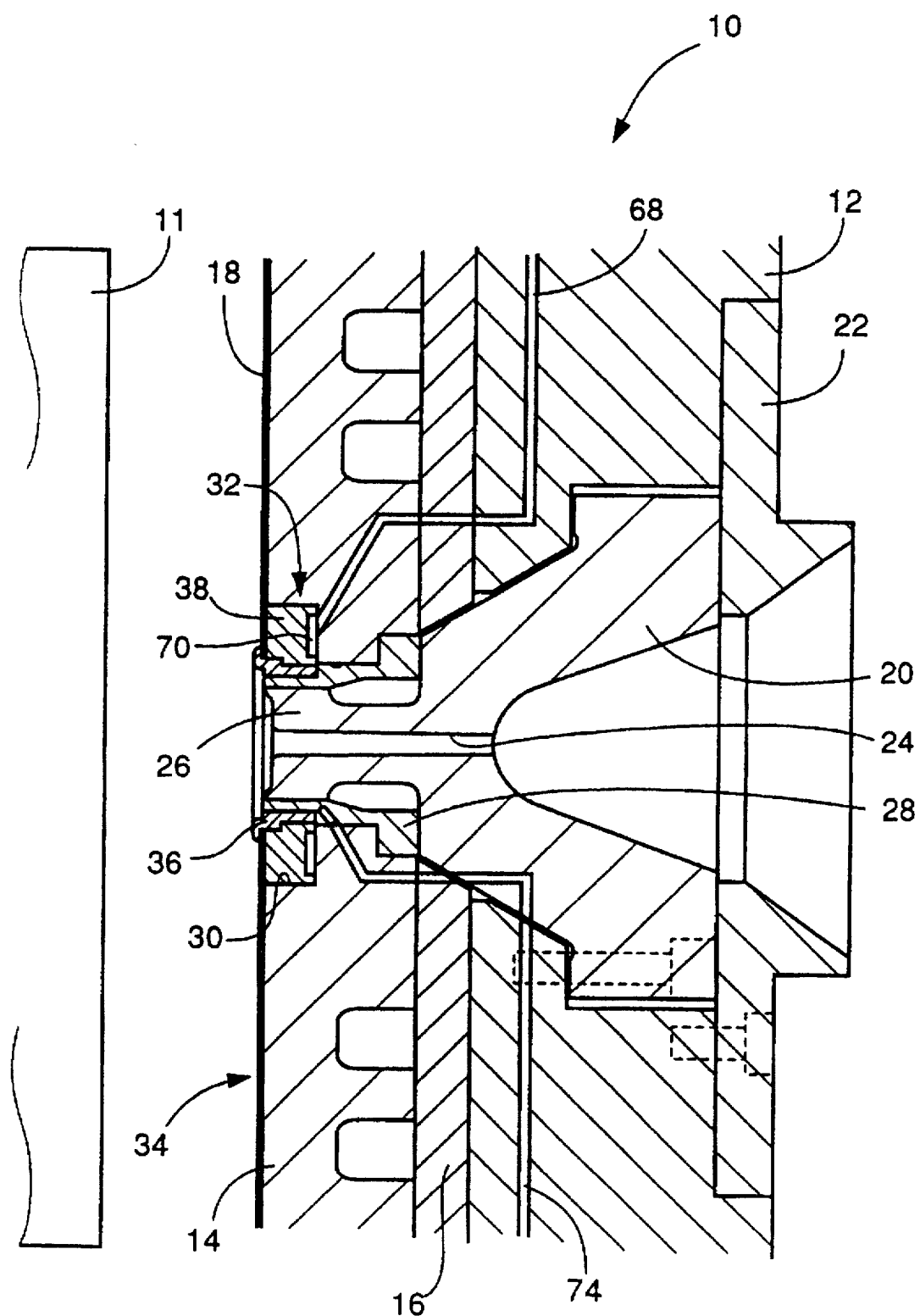
FIG. 1 is a fragmentary view in cross section of a mold constructed according to one embodiment of this invention.
Figure 2:
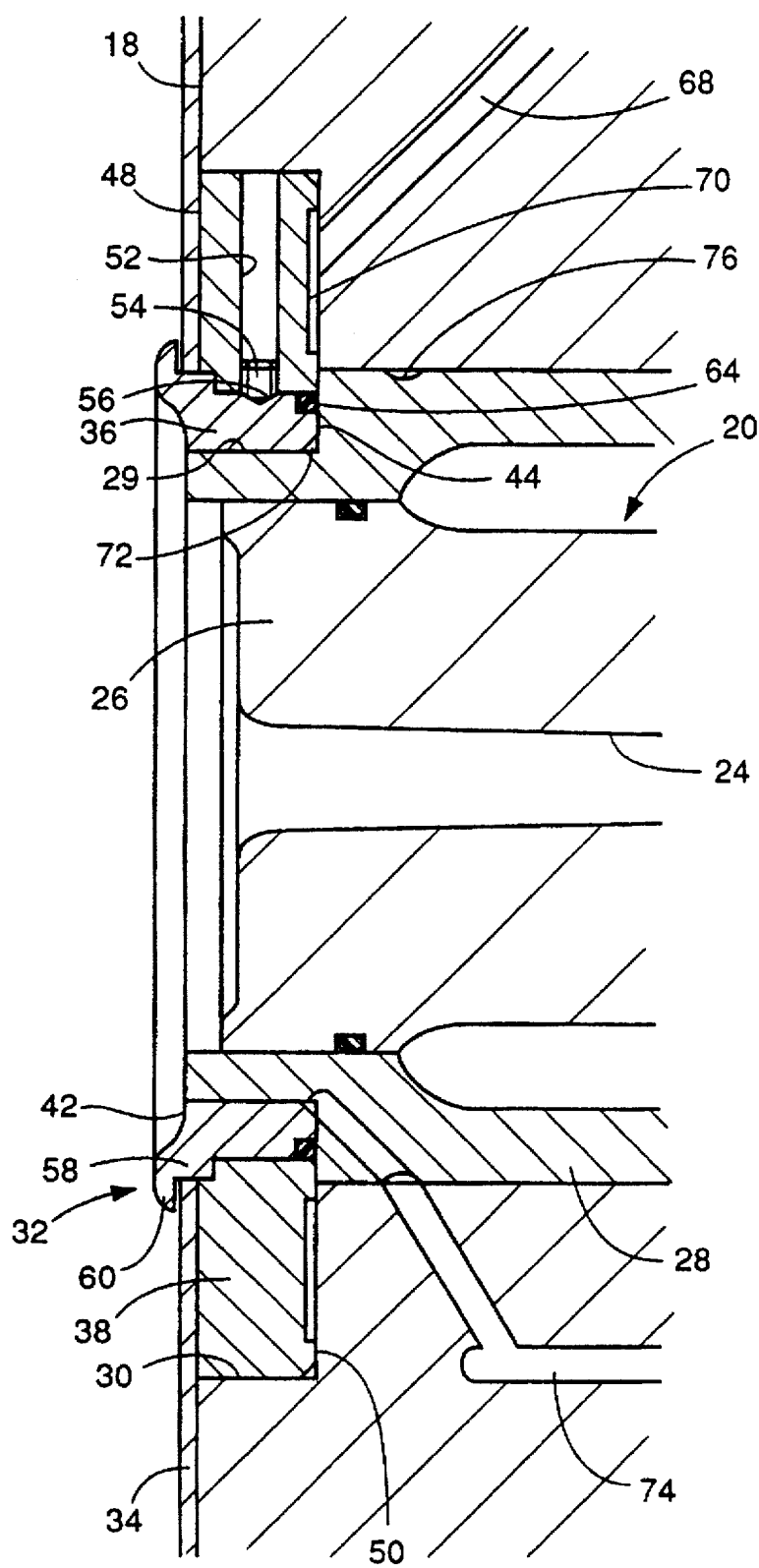
FIG. 2 is an enlarged view of a part of a stationary mold half of the mold of FIG. 1.

Referring first to FIGS. 1 and 2 there is shown in cross section a mold for molding an optical disk, which is constructed according to one preferred embodiment of the present invention. The mold includes a stationary mold half 10 and a movable mold half 11. As well know in the art, the stationary mold half 10 is attached to a stationary member of a mold clamping device (not shown) and is positioned opposite to the movable mold half 11 which is attached to a movable member of the mold clamping device. The movable member of the mold clamping device is movable toward and away from the stationary member, so that the movable mold half 11 is movable toward and away from the stationary mold half 10. Thus, the mold has an open position and a closed position. In the closed position, the stationary mold half 10 and the movable mold half 11 are located close to each other, and cooperate to form a mold cavity therebetween.

More specifically described, the stationary mold half 10 includes an annular mounting plate 12 attached to the stationary member of the mold clamping device, and an annular mirror block 14 which has a comparatively small wall thickness and which is placed on a back plate 16 mounted on the mounting plate 12. The mirror block 14 has a mirror surface 18 which partially defines the mold cavity. In the central portion of the stationary mold half 10, there is disposed a sprue bushing 20, such that the sprue bushing 20 extends through the mounting plate 12, the back plate 16 and the mirror block 14. The sprue bushing 20 is fixed by means of a locating ring 22. The mold cavity is filled with a synthetic resin material which is injected therein through a material feed hole 24 formed in the sprue bushing 20 in connection with a nozzle of an injecting device (not shown).

The sprue bushing 20 includes an axial end portion 26 having a cylindrical shape and a smaller diameter than the other portion. The axial end portion 26 extends through the mirror block 14. An annular female cutter sleeve 28 is disposed radially outwardly of the axial end portion 26 of the sprue bushing 20. That is, the female cutter sleeve 28 is fixedly interposed between the axial end portion 26 of the sprue bushing 20 and the mirror block 14. One of the axially opposite end faces of the sprue bushing 20 which partly defines the mold cavity is offset by a small distance in the axially inward direction (right direction as seen in FIGS. 1 and 2) from the corresponding axial end face of the female cutter sleeve 28, so that a male cutter sleeve which is disposed in the movable mold half 11 can be advanced into the end portion of the female cutter sleeve 28. More specifically described, the movable mold half 11 is moved toward the stationary mold half 10 to the predetermined mold closing position, to thereby define the mold cavity therebetween. After the mold cavity is filled with the resin material, the male cutter sleeve is moved toward the stationary mold half 10 and advanced into the center bore of the female cutter sleeve 28, whereby a center hole is cut in the molded optical disk. As is apparent from the above description, an inner circumferential edge at the axial end portion of the female cutter sleeve 28 functions as a female cutter for cutting off a central portion of the molded optical disk and thereby form a center hole in the optical disk.

Figure 5:
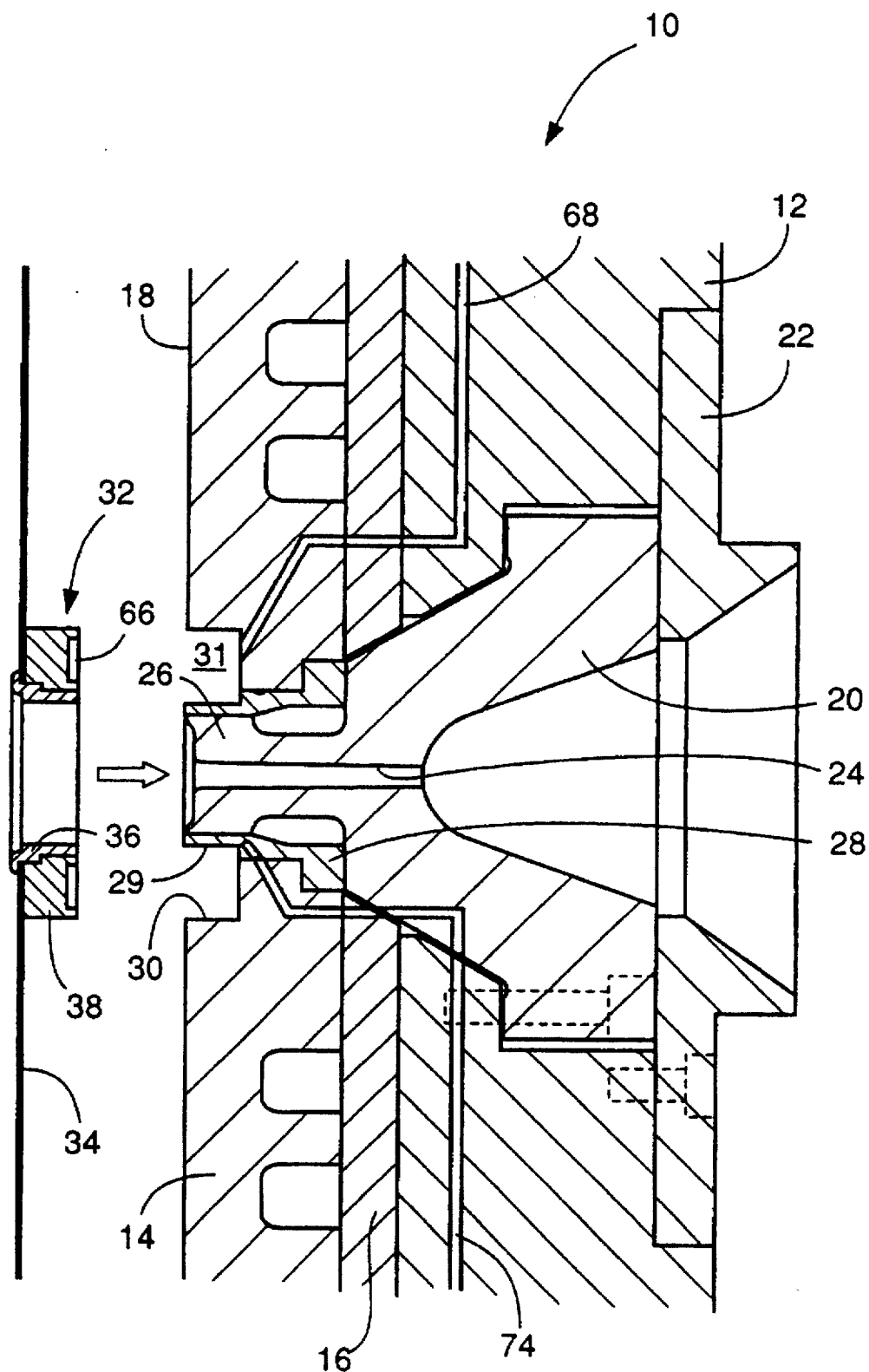
FIG. 5 is a view in cross section of the stationary mold half of FIG. 1, showing a process of attaching the stamper holding member of FIG. 4 into the stationary mold half.

As shown in FIG. 5, the stationary mold half 10 has an annular recess 31 which is open to a radially inner portion of the mold cavity. Namely, the above-indicated axial end portion of the female cutter sleeve 28 has a radially-outer circumferential cutout 29, while the corresponding axial end portion of the mirror block 14 has a radially inner circumferential cutout 30. These circumferential cutouts 29, 30 cooperate each other to define the annular recess 31. In the annular recess 31, there is removably accommodated an annular stamper holding member 32. As is apparent from FIG. 2, an annular stamper 34 in the form of a relatively thin annular plate having desired information is placed on the mirror surface 18 of the mirror block 14, such that the stamper 34 is fitted at its inner periphery on the stamper holding member 32, whereby the stamper 34 is held in position on the stationary mold half 10. With the stamper 34 fixed as described above, the movable mold half 11 is positioned relative to the stationary mold half 10, so as to define the mold cavity therebetween, and the synthetic resin material is injected into the mold cavity. As a result, the optical disk is molded such that the information stored on the stamper 34 is reproduced or copied in a predetermined area of an information-bearing surface of the formed optical disk.

Figure 3:
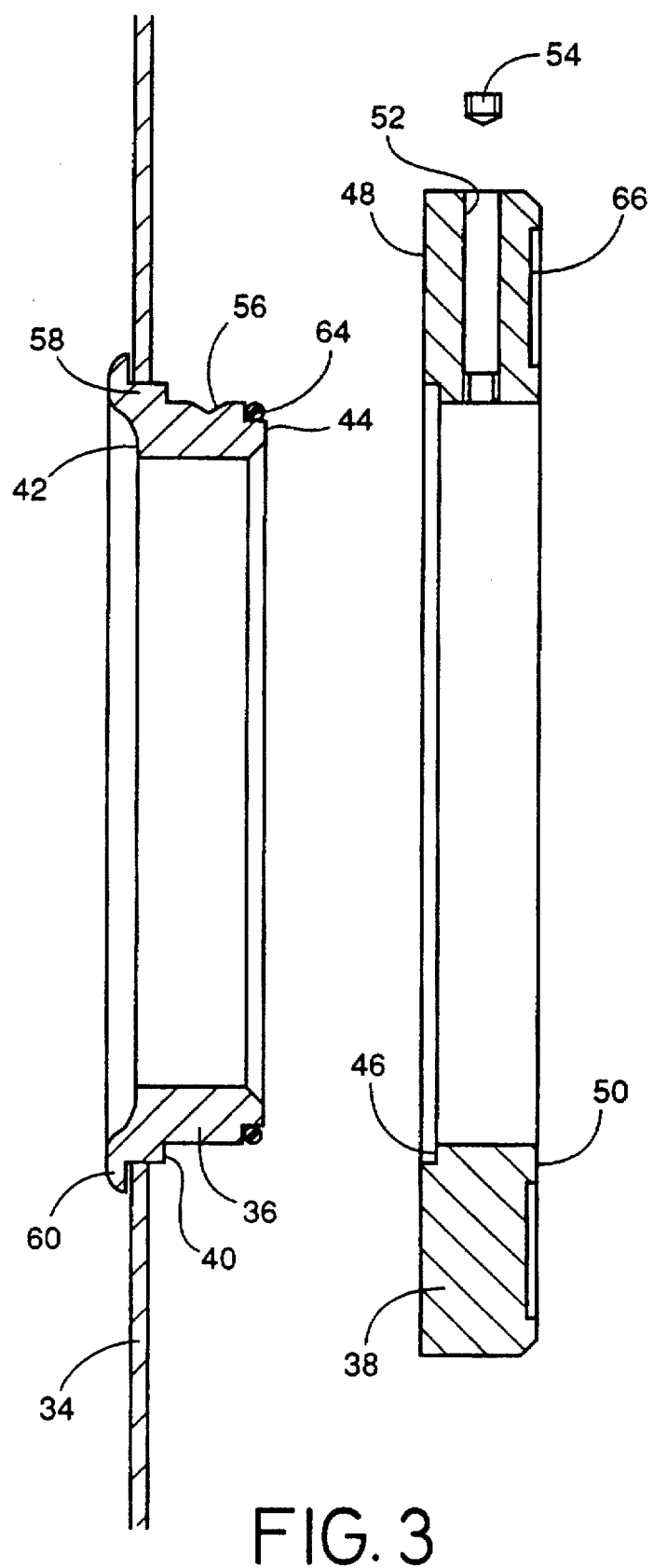
FIG. 3 is an exploded cross sectional view showing a stamper holding member which is disposed on the stationary mold half to hold an annular stamper, as shown in FIG. 1.

As shown in FIG. 3, the stamper holding member 32 includes a first ring member 36 and a second ring member 38, each of which has an annular shape. The first ring member 36 has an inside diameter which is almost equal to the diameter of the radially outer circumferential cutout 29 of the female cutter sleeve 28. That is, the inside diameter of the first ring member 36 is almost equal to the inside diameter of the annular recess 31. The first ring member 36 has an axial dimension which is slightly larger than that of the annular recess 31. The second ring member 38 has an inside diameter almost equal to the outside diameter of the first ring member 36, and has an outside diameter almost equal to the diameter of the radially inner circumferential cutout 30 of the mirror block 14. That is, the outside diameter of the second ring member 38 is almost equal to the outside diameter of the annular recess 31. The axial dimension of the second ring member 38 is almost equal to that of the annular recess 30. The second ring member 38 is fitted on the first ring member 36, in an axial direction from one of the axial opposite ends of the first ring member 36 toward the other axial end.

The first ring member 36 has a stepped outer circumferential surface which has a circumferential shoulder 40 in an axially middle portion thereof, as shown in FIG. 3. In the presence of the circumferential shoulder 40, the outside diameter of the first ring member 36 is larger at an axial portion thereof on the side of a front end face 42 (left end face as seen in FIG. 3), than at an axial portion thereof on the side of a rear end face 44 (right end face). The second ring member 38 has a stepped inner circumferential surface which has a circumferential shoulder 46. In the presence of the circumferential shoulder 46, the inside diameter of the second ring member 38 is larger at an axial portion thereof on the side of a front end face 48 (left end face as seen in FIG. 3), than at an axial portion thereof on the side of a rear end face 50 (right end face). As indicated in FIG. 4, the circumferential shoulders 40, 46 of the first and second ring members 36, 38 are brought into contact with each other, whereby the first and second ring members are positioned to each other in the axial direction, such that rear end faces 44, 50 of the respective first and second ring member 36, 38 are aligned or flush with each other.

Figure 4:
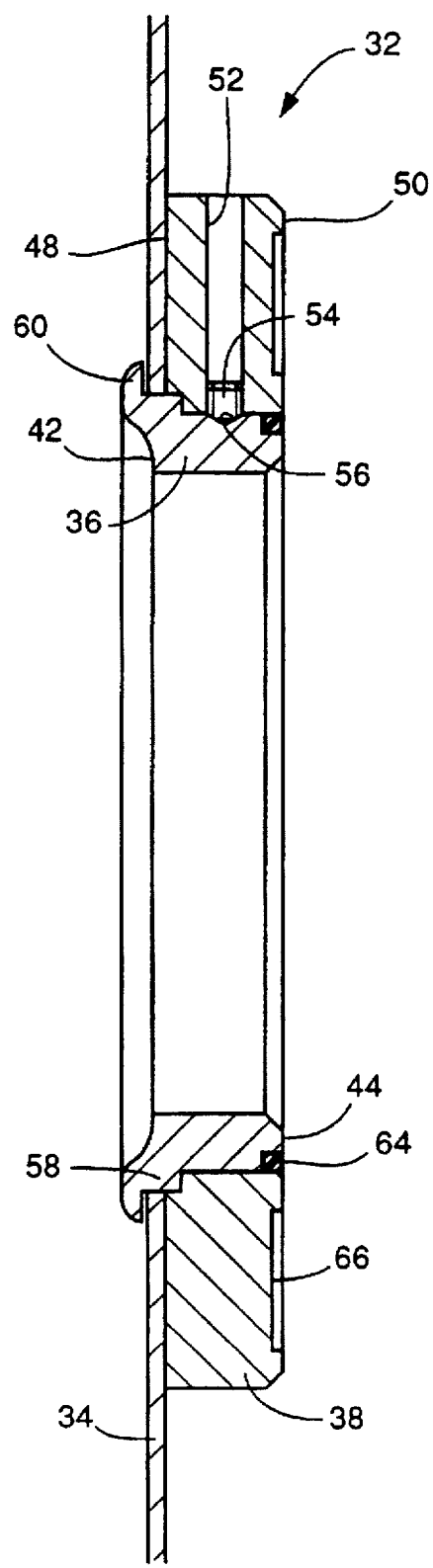
FIG. 4 is a cross sectional view of the stamper holding member of FIG. 3 in which the components are assembled together.

The second ring member 38 further has a tapped hole 52 formed in the radial direction at an axially middle portion thereof, as shown in FIG. 4. On the other hand, the first ring member 36 has a grooved portion 56 in the outer circumferential surface. A set screw 54 is screwed into the tapped hole 52 until the end of the set screw 54 is engaged with the grooved portion 56. Thus, the first and second ring member 36, 38 are connected with each other and positioned relative to each other in the axial direction with the circumferential shoulders 40, 46 held in abutting contact each other.

With the first and second ring members axially positioned relative to each other as described above, the front end face 42 of the first ring member 36 is offset in the axially outward direction (left direction as seen in FIG. 4) by a predetermined distance from the front end face 48 of the second ring member 38. A front end portion 58 of the first ring member 36 which projects in the axially outward direction from the corresponding front end face 48 of the second ring member 38, has an outer diameter which is slightly smaller than an inner diameter of a center hole of the annular stamper 34 which is fitted on the front end portion 58. The front end portion 58 has an integrally formed annular collar portion 60 as its axial end remote from the shoulder 40, such that the annular collar portion 60 extends in the radially outward direction. The annular collar portion 60 is disposed opposite to a radially inner peripheral portion of the front end face 48 of the second ring member 38, with an axial spacing therebetween which is slightly larger than the thickness of the stamper 34.

As is apparent from FIG. 3, the stamper 34 is fitted on the front end portion 58 of the first ring member 36, in the axial direction from the rear end face 44 toward the front end face 42 of the first ring member 36. Then, the second ring member 38 is fitted on the axial portion of the first ring member 36 on the side of the rear end face 44. As most clearly shown in FIG. 4, the first and the second ring members 36, 38 are fixed to each other by the set screw 54, in the predetermined axial relative position as described above, so that the radially inner peripheral portion of the stamper 34 is interposed between the collar portion 60 of the first ring member 36 and the second ring member 38. In this condition, the stamper 34 is held in the predetermined radial position.

The first ring member 36 has a circumferential cutout at the radially outer periphery of the rear end face 44. In this circumferential cutout, there is disposed a sealing rubber 64. The rear end face 50 of the second ring member 38 has a circumferential groove 66 formed at a radially middle portion thereof.

The stamper holding member 32 constructed as described above is inserted into the annular recess 31 formed in the stationary mold half 10, such that the rear end faces 44, 50 of the first and the second ring members 36, 38 face the bottom surface of the annular recess 31, as indicated by an arrow in FIG. 5. Thus, the stamper holding member 32 is accommodated in the annular recess 31 as shown in FIGS. 1 and 2. Inside the stationary mold half 10, there is formed a first air passage 68 which is open in the bottom surface of the annular recess 31. The stamper holding member 32 is securely attached to the stationary mold half 10, with the rear end face 50 of the second ring member 38 being attracted to the bottom surface of the annular recess 31 under suction of vacuum air which is supplied through the first air passage 68 to the rear end face 50. When the stamper holding member 32 is attached to the stationary mold half 10, the front end face 42 of the first ring member 36 is flush with the corresponding end face of the female cutter sleeve 28. These front end faces cooperate each other to partially define the mold cavity. On the other hand, the front end face 48 of the second ring member 38 is flush with the mirror surface 18 of the mirror block 14. The front end face 48 and the mirror surface 18 cooperate each other to provide a stamper bearing surface on which the stamper is held. In the rear end face 50 of the second ring member 38, there is formed an annular groove 66 which is closed by the bottom surface of the annular recess 31, so as to define a first annular air chamber 70. The first air passage 68 is connected to and open to the first annular air chamber 70, so that the vacuum is applied through the first air passage 68 to the rear end face 50 of the second ring member 38 over a sufficiently large area.

To facilitate the insertion of the stamper holding member 32 in the annular recess 31 of the stationary mold half 10, the inner peripheral edge of the rear end face 44 of the first ring member 36 and the outer peripheral edge of the rear end face 50 of the second ring member 38 are chamfered. The chamfer at the inner periphery of the rear end face 44 of the first ring member 36 cooperates with the corresponding inner peripheral edge of the bottom surface of the annular recess 31 to define a second annular air chamber 72. A second air passage 74 is formed in the stationary mold half 10, and is connected to and open to the second annular air chamber 72. A stream of compressed air is fed through the second air passage 74 to the second annular air chamber 72. The compressed air is supplied from the air chamber 72 to the mold cavity through a clearance or gap between the inner circumferential surface of the first ring member 36 and the outer circumferential surface of the cutout 29 of the female cutter sleeve 28.

Inside the stationary mold half 10, there is also formed an annular communication channel 76 at an interface between the female cutter sleeve 28 and the mirror block 14. This annular communication channel 76 forms a part the second air passage 74. At the annular communication channel 76, the second air passage 74 is branched into a plurality of branch passages which communicate with respective circumferential portions of the second annular chamber 72. In this arrangement, a stream of compressed air provided through the second air passage 74 is evenly distributed to the second annular chamber 72 and uniformly supplied to the mold cavity through the clearance between the inner circumferential surface of the first ring member 36 and the outer circumferential surface of the female cutter sleeve 28. The sealing rubber 64 effectively prevents the leakage of the compressed air from the second annular air chamber 72 toward the second ring member 38 or first annular air chamber 70. This arrangement permits effective application of compressed air to the mold cavity through the clearance between the first ring member 36 and the female cutter sleeve 28.

To facilitate removal of the optical disk molded in the mold cavity from the stationary mold half 10, the compressed air is fed to the optical disk through the clearance between the first ring member 36 and the female cutter sleeve 28, upon opening the stationary mold half 10 and the movable mold half 11.

In the stationary mold half 10 constructed as described above, the stamper holding member 32 has the collar portion 60 for holding the stamper 34 at the inner peripheral portion onto the stationary mold half 10, and is held in annular recess 31 of the stationary mold half 10 under suction by the vacuum air supplied thereto. In this arrangement, the stamper holding member 32 as well as the stamper 34 is installed on and removed from the stationary mold half 10 with ease, assuring improved efficiency of the molding operation.

In the illustrated embodiment, the stamper holding member 32 is attached to the stationary mold half 10 by the vacuum air supplied thereto, so that the stamper holding member 32 can be small-sized, and the required mechanical strength of the stamper holding member 32 can be reduced. In addition, in the illustrated embodiment, the second ring member 38 is disposed so as to support the stamper 34 and the rear end face 50 of this second ring member 38 is provided with the annular groove 66 which partially defines the first annular air chamber 70 to which the vacuum is applied. This arrangement is effective to reduce the required wall thickness of the first ring member 36, while assuring a sufficient strength of attachment of the stamper holding member 32 to the stationary mold half 10. As a result, an sufficient space is provided for the female cutter sleeve 28 to be disposed in the center bore of the stamper holding member 32, even where the stamper has a relatively small inside diameter. Therefore, there can be provided a sufficiently large clearance between the first ring member 36 and the female cutter sleeve 28, so that the compressed air is fed into the mold cavity through this large clearance.

According to the illustrated embodiment, the removal of the molded optical disk is facilitated by the compressed air supplied to the mold cavity, as described above. Further, the reduction of the wall thickness of the first ring member 36 results in reduction of the diameter of the collar portion 60, which makes it possible to increase the printable surface area in the radially inner portion of the molded optical disk. Therefore, the present embodiment constructed as described above is suitable for molding the so-called "super-picture bearing optical disk".

When the stamper 34 is placed on the stationary mold half 10, a clearance between the inner periphery of the stamper 34 and the outer circumference of the stamper holding member 32 is closed by the collar portion 60 at the axial end of the first ring member 36. Thus, a flow of the synthetic resin material into the above-indicated clearance is effectively prevented by the collar portion 60 during the molded operation, thereby preventing formation of burrs at the inner periphery of the molded optical disk.

While the present invention has been described in detail in its presently preferred embodiment by reference to the accompanying drawings, for illustrative purpose only, it is to be understood that the invention is not limited to the details of the illustrated embodiment.

While the stamper is attached to the stationary mold half 10 in the illustrated embodiment, the present invention may be applied to a mold wherein the stamper is attached to the movable mold half. In this case, a guide sleeve for guiding a male cutter is used in place of the female cutter sleeve of the stationary mold half, for example, to provide a clearance between the guide sleeve and the first ring member through which compressed air is fed to the stamper.

In the illustrated embodiment, the vacuum air is applied to only the second ring member 38 of the stamper holding member 32. However, the vacuum air may be applied to the first ring member 36 rather than or as well as the second ring member 38.

Preferably, a radially outer portion of the stamper 34 is fixed to the mirror surface 18 of the mirror block 14, by appropriate means known in the art such as vacuum air, or a holding member.

It is to be understand that the present invention may be embodied with various other changes, modifications and improvements, which may occur to those skilled in the art, in the light of the foregoing teachings, without departing from the spirit and scope of the invention defined in the following claims.

What is claimed is:

1. A mold for molding an optical disk, comprising:
   a pair of mold halves which cooperate to form a mold cavity for forming said optical disk, one of said mold halves having an annular recess which is open to a radially inner portion of said mold cavity;
   an annular plate-like stamper having a center hole and positioned in said mold cavity, said stamper having information to be copied on said optical disk; and
   a stamper holding member removably accommodated in said annular recess, for supporting said stamper at a radially inner peripheral portion thereof which defines said center hole, said stamper holding member including (a) a first ring member extending through said center hole of said stamper such that said stamper is fitted on said first ring member, said first ring member having an annular collar portion which extends radially outwardly from one of axially opposite ends of said first ring member, and (b) a second ring member removably fitted on an axial end portion of said first ring member which is remote from said one of said axially opposite ends, said stamper being positioned such that said radially inner peripheral portion is interposed between said annular collar portion of said first ring member and a radially inner portion of said second ring member, and wherein said one of said mold halves has a first air passage and a second air passage which are open to respective portions of said annular recess, so that vacuum is applied through said first air passage to said stamper holding member to hold under suction said stamper holding member to said one of said mold halves, and so that compressed air is introduced into said mold cavity through a clearance between an inner circumferential surface of said first ring member and an outer circumferential surface of said one of said mold halves which defines an inside diameter of said annular recess.

2. A mold according to claim 1, wherein said first air passage is open in a bottom surface of said annular recess, which bottom surface contacts said second ring member, said one of said mold halves including a sealing member for providing air tightness between open ends of said first and second air passages which are open to said respective portions of said annular recess.

3. A mold according to claim 1, wherein said one of said mold halves has a portion which cooperates with said stamper holding member to define a first annular air chamber and a second annular air chamber which communicate with said first and second air passages, respectively.

4. A mold according to claim 1, wherein said stamper holding member includes positioning means for axially positioning said second ring member relative to said first ring member.

5. A mold according to claim i, wherein said one of said mold halves includes a female cutter sleeve having an end portion whose outer circumferential surface defines said inside diameter of said annular recess, said female cutter sleeve having a cutting edge at said end portion thereof for cutting off a central portion of said optical disk formed in said mold cavity in the presence of said annular plate-like stamper.

6. A mold according to claim 5, wherein said one of said mold halves further includes an annular mirror block having a mirror surface which partially defines said mold cavity and which contacts one of opposite surfaces of said stamper, said information being provided on the other of said opposite surface of said stamper.

7. A mold according to claim 6, wherein said female cutter sleeve is disposed radially inwardly of said mirror block such that said end portion of said female cutter sleeve cooperates with a corresponding end portion of said mirror block to define said annular recess.

8. A mold according to claim 7, wherein said end portion of said female cutter sleeve has a radially outer circumferential cutout, while said corresponding end portion of said mirror block has a radially inner circumferential cutout which cooperates with said radially outer circumferential cutout to define said annular recess.

9. A mold according to claim 1, wherein said pair of mold halves consists of a stationary mold half and a movable mold half which is movable relative to said stationary mold half, said annular plate-like stamper and said stamper holding member being provided for at least said stationary mold half.

10. A mold according to claim 1, wherein said first ring member has a stepped outer circumferential surface having a first shoulder, while said second ring member has a stepped inner circumferential surface having a second shoulder which is held in contact said first shoulder, said radially inner peripheral portion of said stamper being located between said annular collar portion and said first shoulder in an axial direction of said first ring member.

* * * * *